United States Patent
Nayak et al.

(10) Patent No.: US 10,924,375 B2
(45) Date of Patent: Feb. 16, 2021

(54) APPARATUS, SYSTEM, AND METHOD FOR PROBING THE STATUS OF UNREACHABLE VIRTUAL INTERFACES PARTITIONED ON REMOTE PHYSICAL INTERFACES

(71) Applicant: Juniper Networks, Inc., Sunnyvale, CA (US)

(72) Inventors: Manoj Nayak, Bangalore (IN); Ronald Bonica, Sterling, VA (US); Rafik Puttur, Dakshina Kannada (IN)

(73) Assignee: Juniper Networks, Inc, Sunnyvale, CA (US)

( * ) Notice: Subject to any disclaimer, the term of this patent is extended or adjusted under 35 U.S.C. 154(b) by 128 days.

(21) Appl. No.: 16/259,784

(22) Filed: Jan. 28, 2019

(65) Prior Publication Data

US 2020/0244560 A1 Jul. 30, 2020

(51) Int. Cl.
*H04L 12/26* (2006.01)
*G06F 9/455* (2018.01)

(52) U.S. Cl.
CPC .......... *H04L 43/10* (2013.01); *G06F 9/45558* (2013.01); *H04L 43/0811* (2013.01); *H04L 43/12* (2013.01); *G06F 2009/45595* (2013.01)

(58) Field of Classification Search
CPC ... H04L 43/10–12; H04L 43/50; H04L 69/40; H04L 49/70
See application file for complete search history.

(56) References Cited

U.S. PATENT DOCUMENTS

| | | | | |
|---|---|---|---|---|
| 9,992,086 | B1* | 6/2018 | Mizik | H04L 43/0817 |
| 2015/0103679 | A1* | 4/2015 | Tessmer | H04L 43/50 370/252 |
| 2016/0269246 | A1* | 9/2016 | Masuda | H04L 41/12 |
| 2019/0245949 | A1* | 8/2019 | Wang | H04L 69/22 |

OTHER PUBLICATIONS

Broadcom, "NetXtreme®-C/NetXtreme-E", URL: https://docs.broadcom.com/docs/NetXtreme-UG, as accessed on Jan. 15, 2019, pp. 1-58.
Dell, "Broadcom Ethernet Network Controller Enhanced Virtualization Functionality", URL: https://www.dell.com/downloads/global/products/pedge/en/BroadcomDellEnhanceVirualizationFunctionalityWhitePaper.pdf, A dell technical White Paper, Jul. 2010, 11 pages.
(Continued)

*Primary Examiner* — Marcus Smith
(74) *Attorney, Agent, or Firm* — FisherBroyles, LLP

(57) ABSTRACT

A disclosed method may include (1) receiving, at a proxy node within a network, an echo request from a probing node within the network, (2) identifying, within the echo request, a type of probe to be performed in connection with the echo request, (3) determining, based at least in part on the type of probe identified within the echo request, that a proxy interface included on the proxy node is to probe a status of a virtual interface partitioned on a physical interface, (4) probing, via the proxy interface, the status of the virtual interface partitioned on the physical interface by way of a virtual function index assigned to the virtual interface, and then (5) sending, to the probing node, an echo reply that identifies the status of the virtual interface partitioned on the physical interface. Various other apparatuses, systems, and methods are also disclosed.

17 Claims, 7 Drawing Sheets

(56) References Cited

OTHER PUBLICATIONS

Intel, "PCI-SIG SR-IOV Primer an Introduction to SR-IOV Technology", URL: https://www.intel.sg/content/dam/doc/application-note/pci-sig-sr-iov-primer-sr-iov-technology-paper.pdf, Intel® LAN Access Division, Jan. 2011, pp. 1-28.

Bonica et al., "PROBE: A Utility for Probing Interfaces", URL: https://tools.ietf.org/html/rfc8335, Internet Engineering Task Force, Feb. 2018, pp. 1-19.

* cited by examiner

```
                         Echo Reply
                            124

---------------------------------------------------------------
*************************************************

0                   1                   2                   3
     0 1 2 3 4 5 6 7 8 9 0 1 2 3 4 5 6 7 8 9 0 1 2 3 4 5 6 7 8 9 0 1
    +-+-+-+-+-+-+-+-+-+-+-+-+-+-+-+-+-+-+-+-+-+-+-+-+-+-+-+-+-+-+-+-+
    |     Type      |     Code      |          Checksum             |
    +-+-+-+-+-+-+-+-+-+-+-+-+-+-+-+-+-+-+-+-+-+-+-+-+-+-+-+-+-+-+-+-+
    |           Identifier          | Sequence Number | State |Res|A| 4| 6|
    +-+-+-+-+-+-+-+-+-+-+-+-+-+-+-+-+-+-+-+-+-+-+-+-+-+-+-+-+-+-+-+-+

APPARATUS, SYSTEM, AND METHOD FOR PROBING THE STATUS OF UNREACHABLE VIRTUAL INTERFACES PARTITIONED ON REMOTE PHYSICAL INTERFACES

BACKGROUND

Network devices (such as routers and switches) are often used to forward traffic within a network and/or across networks. These network devices may represent and/or form the infrastructure of such networks. In some examples, these network devices may include and/or house various physical interfaces, such as Network Interface Cards (NICs). While these physical interfaces are up and/or active, they may be able to forward traffic onto the next hop. Unfortunately, while these physical interfaces are down and/or inactive, they may be unable to forward such traffic onto the next hop.

To facilitate and/or maintain the flow of traffic despite certain physical interfaces occasionally becoming inactive, the status of such physical interfaces may be important. Accordingly, these physical interfaces may remotely probe the status of one another to facilitate redirecting traffic when necessary. In some examples, these physical interfaces may each be logically partitioned into multiple virtual interfaces. Unfortunately, conventional probing technologies may be unable to determine the status of remote virtual interfaces that are partitioned on such physical interfaces.

The instant disclosure, therefore, identifies and addresses a need for additional and improved apparatuses, systems, and methods for probing the status of unreachable virtual interfaces partitioned on remote physical interfaces.

SUMMARY

As will be described in greater detail below, the instant disclosure generally relates to apparatuses, systems, and methods for probing the status of unreachable virtual interfaces partitioned on remote physical interfaces. In one example, a method for accomplishing such a task may include (1) receiving, at a proxy node within a network, an echo request from a probing node within the network, (2) identifying, within the echo request, a type of probe to be performed in connection with the echo request, (3) determining, based at least in part on the type of probe identified within the echo request, that a proxy interface included on the proxy node is to probe a status of a virtual interface partitioned on a physical interface, (4) probing, via the proxy interface, the status of the virtual interface partitioned on the physical interface by way of a virtual function index assigned to the virtual interface, and then (5) sending, to the probing node, an echo reply that identifies the status of the virtual interface partitioned on the physical interface.

Similarly, a system that implements the above-identified method may include a physical processor configured to execute various modules stored in memory on a proxy node. In one example, this system may include and/or execute (1) a receiving module that receives an echo request from a probing node within the network, (2) an identification module that (A) identifies, within the echo request, a type of probe to be performed in connection with the echo request and (B) determines, based at least in part on the type of probe identified within the echo request, that a proxy interface included on the proxy node is to probe a status of a virtual interface partitioned on a physical interface, (3) a probing module that probes, via the proxy interface, the status of the virtual interface partitioned on the physical interface by way of a virtual function index assigned to the virtual interface, and (4) a reply module that sends, to the probing node, an echo reply that identifies the status of the virtual interface partitioned on the physical interface.

Additionally or alternatively, an apparatus that implements the above-identified method may include a proxy interface that is communicatively coupled to (1) a probing interface included on a probing node within a network and (2) a virtual interface partitioned on a physical interface. The apparatus may also include a processing device that is communicatively coupled to the proxy interface. In one example, the processing device may (1) receive, via the proxy interface, an echo request from the probing node within the network, (2) identify, within the echo request, a type of probe to be performed in connection with the echo request, (3) determine, based at least in part on the type of probe identified within the echo request, that a proxy interface included on the proxy node is to probe a status of the virtual interface partitioned on the physical interface, (4) probe, via the proxy interface, the status of the virtual interface partitioned on the physical interface by way of a virtual function index assigned to the virtual interface, and (5) send, to the probing node via the proxy interface, an echo reply that identifies the status of the virtual interface partitioned on the physical interface.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 6 is an illustration of an exemplary echo reply that identifies the status of a virtual interface partitioned on a remote physical interface.

Figure 1:
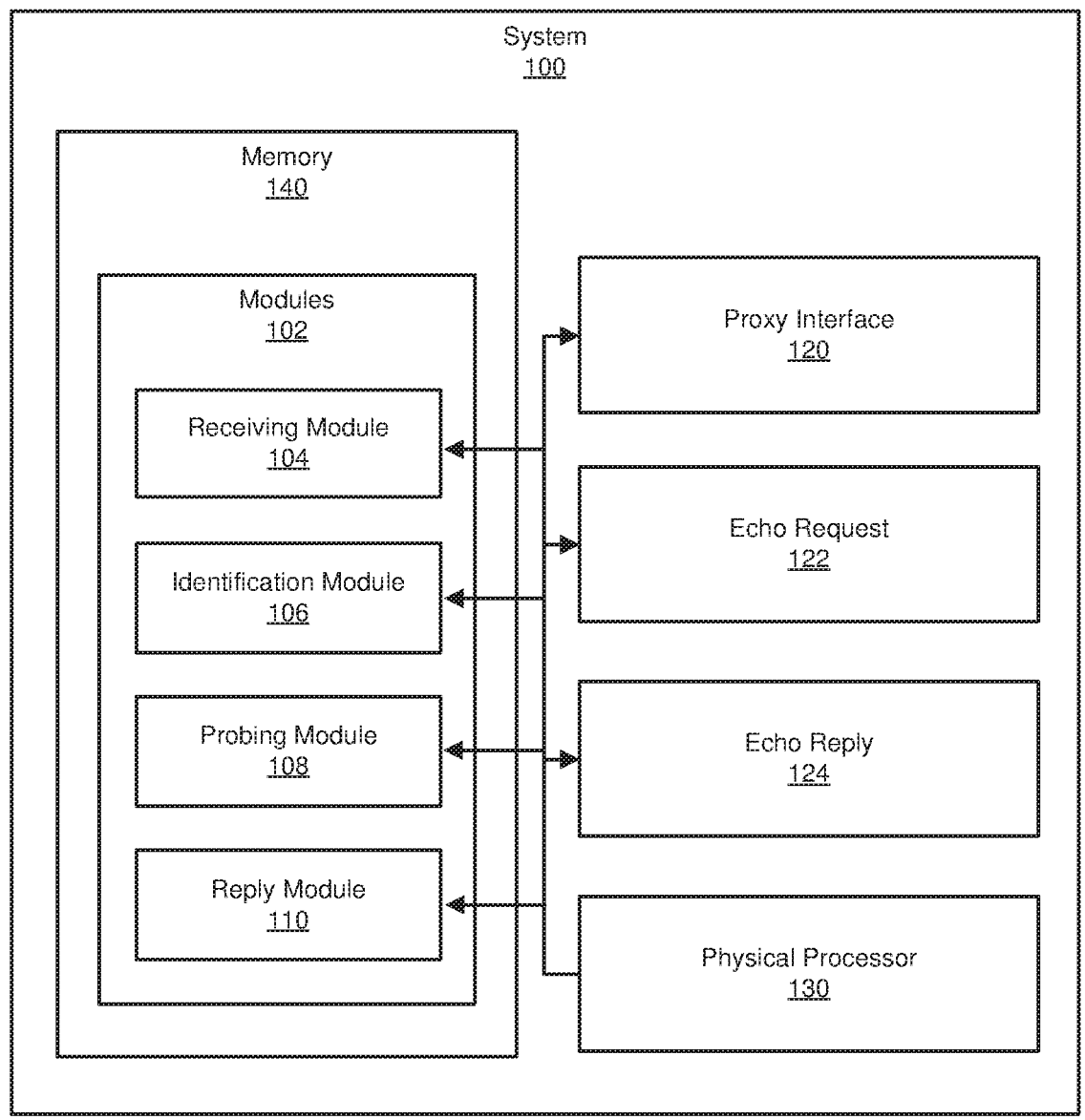
FIG. 1 is a block diagram of an exemplary system for probing the status of unreachable virtual interfaces partitioned on remote physical interfaces.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various systems and methods for probing the status of unreachable virtual interfaces partitioned on remote physical interfaces. As will be explained in greater detail below, embodiments of the instant disclosure may enable probing interfaces to determine the status of unreachable virtual interfaces partitioned on remote physical interfaces. For example, a probing interface located on a probing node may lack direct connectivity and/or communication with a remote virtual interface. In this example, the remote virtual interface may be logically partitioned on a physical interface located on a probed node.

While the probing node and/or interface may lack direct connectivity and/or communication with the probed node, the probing node and/or interface may have direct connectivity and/or communication with a proxy node and/or interface. This proxy node and/or interface may also have connectivity and/or communication with the probed node, remote physical interface, and/or virtual interface.

Accordingly, the probing interface located on the probing node may be able to probe the status of the virtual interface partitioned on the remote physical interface by issuing an echo request to the proxy interface located on the proxy node. In one example, this echo request may prompt the proxy interface to perform a probe on the virtual interface based at least in part on the virtual function index. In response to the echo request, the proxy interface may probe the remote physical interface located on the probed node for the status of the virtual interface partitioned on the remote physical interface. This probe may involve identifying the virtual interface by the virtual function index to the remote physical interface.

Once the proxy interface has successfully probed the status of the virtual interface, the proxy interface may send an echo reply to the probing interface. In one example, this echo reply may identify the status of the virtual interface. In this way, the probing interface may be able to determine the status of the virtual interface partitioned on the remote physical interface despite not having direct connectivity and/or communication with the remote physical interface. By doing so, the probing interface may be able to facilitate, maintain, and/or redirect the flow of traffic in the event that certain virtual interfaces go offline and/or return online.

Figure 2:
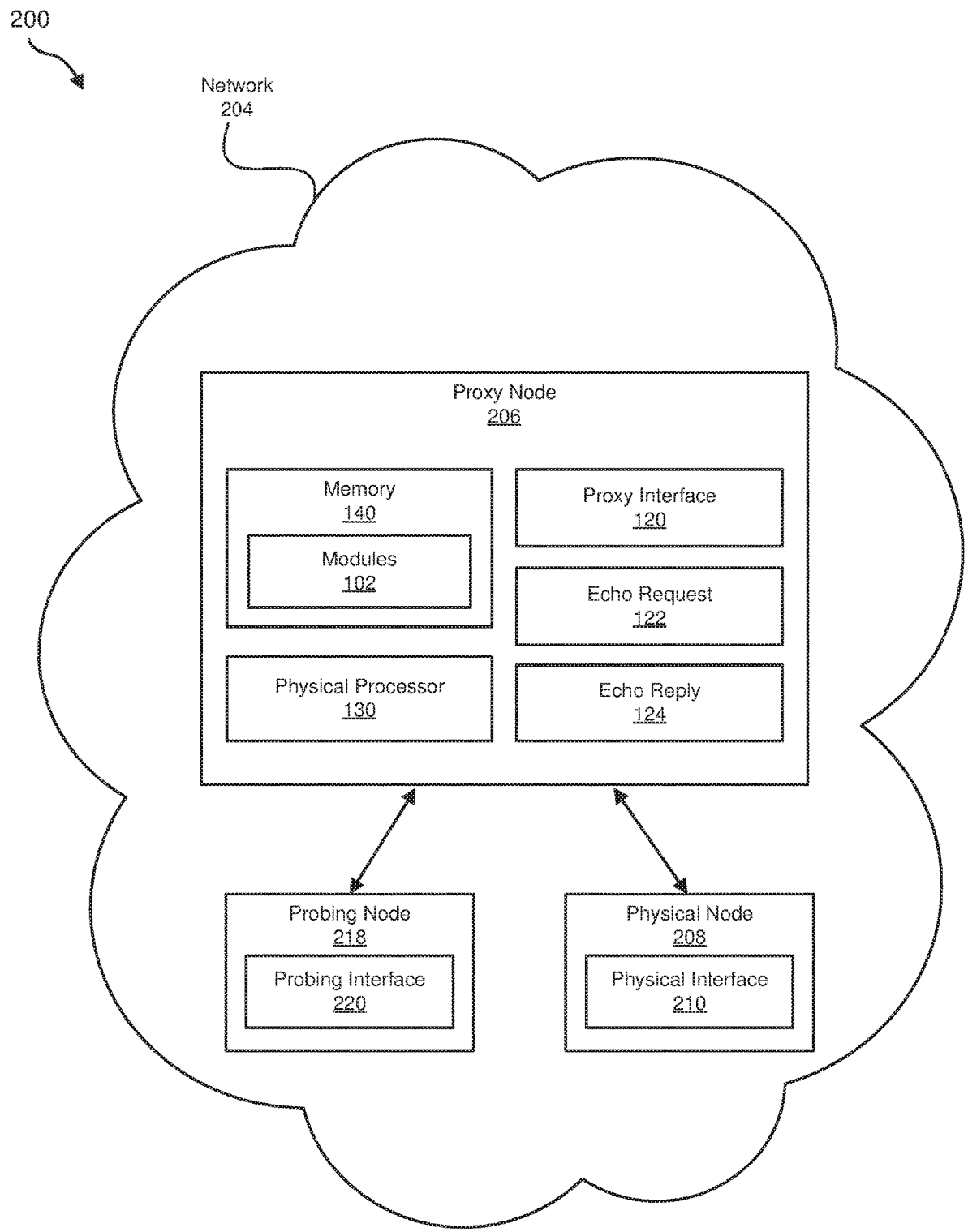
FIG. 2 is a block diagram of an additional exemplary system for probing the status of unreachable virtual interfaces partitioned on remote physical interfaces.
Figure 3:
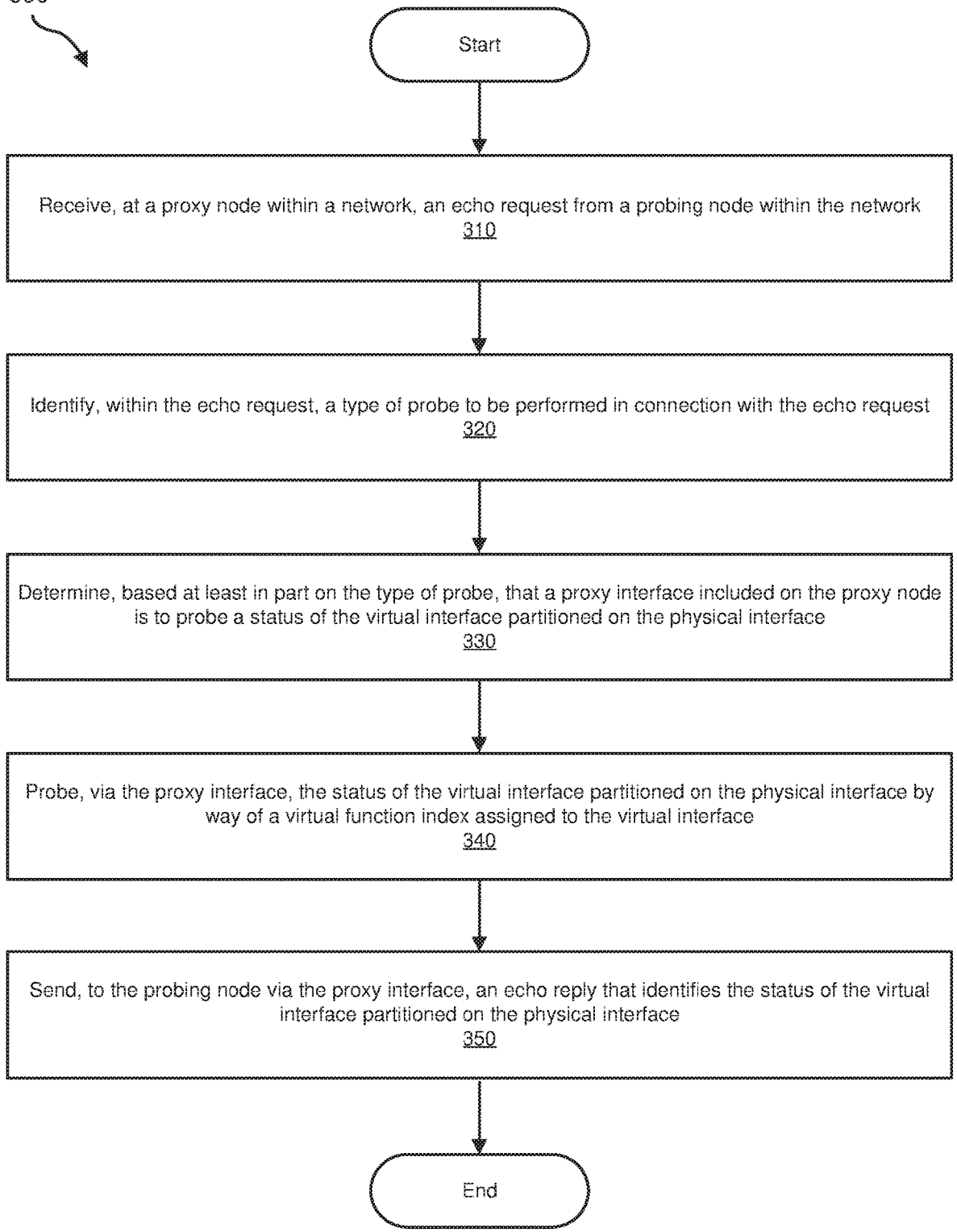
FIG. 3 is a flow diagram of an exemplary method for probing the status of unreachable virtual interfaces partitioned on remote physical interfaces.
Figure 4:
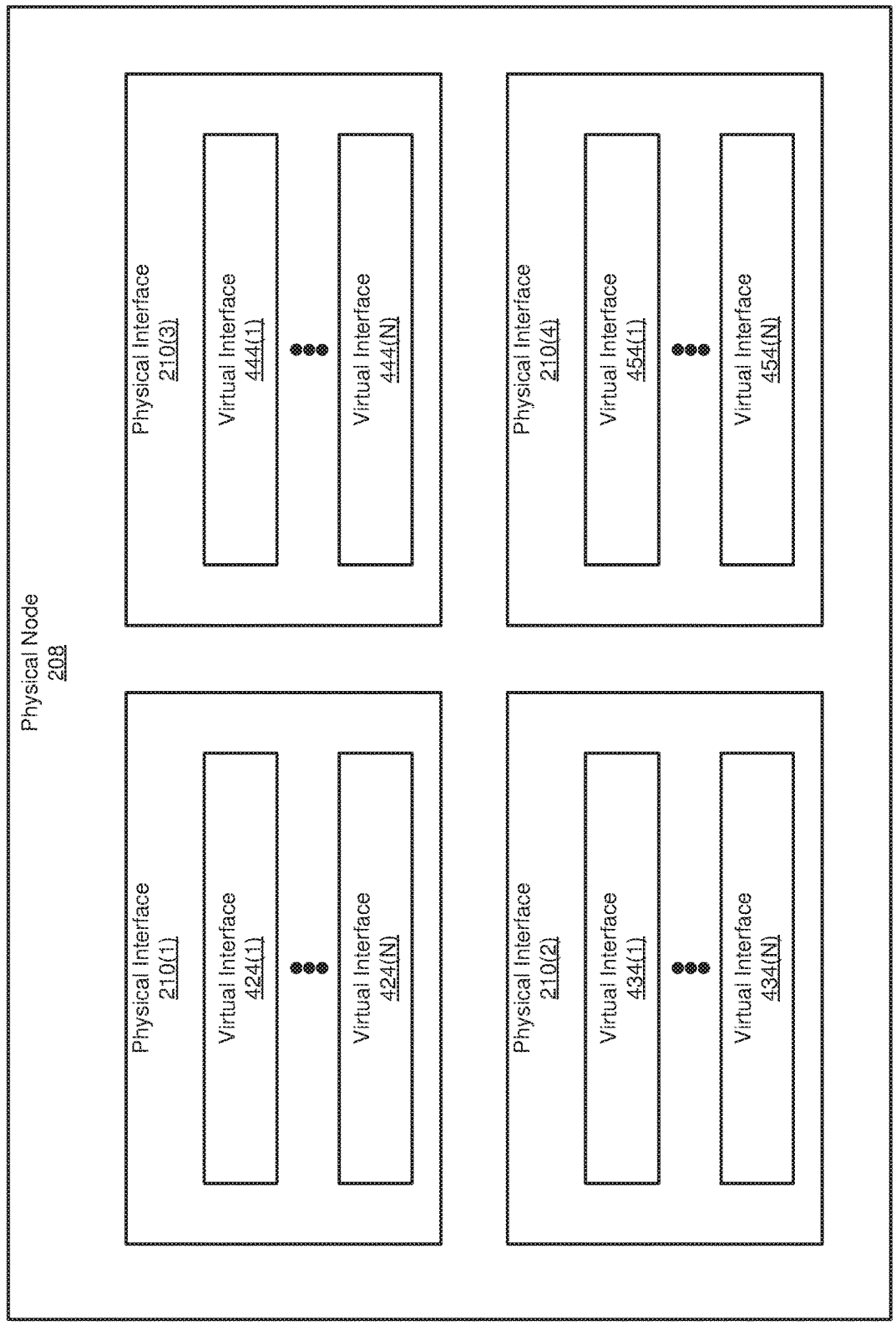
FIG. 4 is a block diagram of exemplary virtual interfaces partitioned on multiple physical interfaces of a physical node.

The following will provide, with reference to FIGS. 1, 2, and 4, detailed descriptions of exemplary apparatuses, systems, and corresponding implementations for probing the status of unreachable virtual interfaces partitioned on remote physical interfaces. Detailed descriptions of corresponding computer-implemented methods will be provided in connection with FIG. 3. Detailed descriptions of an exemplary echo request and an exemplary echo reply will be provided in connection with FIGS. 5 and 6. In addition, detailed descriptions of an exemplary computing system for carrying out these methods will be provided in connection with FIG. 7.

FIG. 1 shows an exemplary system 100 that facilitates probing the status of unreachable virtual interfaces partitioned on remote physical interfaces. As illustrated in FIG. 1, system 100 may include one or more modules 102 for performing one or more tasks. As will be explained in greater detail below, modules 102 may include a receiving module 104, an identification module 106, a probing module 108, and a reply module 110. Although illustrated as separate elements, one or more of modules 102 in FIG. 1 may represent portions of a single module or application (such as an operating system and/or a probing application).

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent modules stored and configured to run on one or more computing devices, such as the devices illustrated in FIG. 2 (e.g., proxy node 206, probing node 218, and/or physical node 208). One or more of modules 102 in FIG. 1 may also represent all or portions of one or more special-purpose computers configured to perform one or more tasks.

As illustrated in FIG. 1, exemplary system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, exemplary system 100 may also include one or more physical processors, such as physical processor 130. Physical processor 130 generally represents any type or form of hardware-implemented processing device capable of interpreting and/or executing computer-readable instructions. In one example, physical processor 130 may access and/or modify one or more of modules 102 stored in memory 140. Additionally or alternatively, physical processor 130 may execute one or more of modules 102 to probe the status of unreachable virtual interfaces partitioned on remote physical interfaces. Examples of physical processor 130 include, without limitation, CPUs, microprocessors, microcontrollers, Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, exemplary system 100 may further include one or more interfaces, such as a proxy interface 120. In some examples, proxy interface 120 may include and/or represent a physical and/or virtual interface that facilitates the flow of traffic within a network and/or across networks. For example, proxy interface 120 may include and/or represent a NIC that has direct connections with other interfaces within a network. Additional examples of proxy interface 120 include, without limitation, packet forwarding engines, routing engines, Physical Interface Cards (PICs), Flexible PIC Concentrators (PCs), Switch Interface Boards (SIBs), control boards, communication ports, fan trays, connector interface panels, line cards, egress interfaces, ingress interfaces, virtual interfaces, portions of one or more of the same, combinations or variations of one or more of the same, and/or any other suitable interface.

As illustrated in FIG. 1, exemplary system 100 may additionally include one or more requests, such as echo request 122. In some examples, echo request 122 may include and/or represent an Internet Control Message Protocol (ICMP) extended echo request. In one example, the ICMP extended echo request may be formatted in and/or defined for ICMPv4 and/or ICMPv6. Additionally or alternatively, the ICMP extended echo request may include and/or be encapsulated in an Internet Protocol (IP) header, such as an IPv4 header and/or IPv6 header.

In some examples, echo request 122 may include one or more fields, such as IP header fields and/or ICMP fields. In one example, the IP header fields may include and/or identify a source address and/or a destination address for echo request 122. The source address may include and/or represent an IP address of the computing device and/or interface from which echo request 122 originates. The destination address may include and/or represent the IP address of the computing device and/or interface serving as a proxy for probing the status of a virtual interface partitioned on a remote physical interface. Examples of such ICMP fields include, without limitation, a type of request and/or probe, a code, a checksum, an identifier, a sequence number, a reserved field, a local bit, an ICMP extension structure, combinations or variations of one or more of the same, and/or any other suitable fields.

As illustrated in FIG. 1, exemplary system 100 may additionally include one or more replies, such as echo reply 124. In some examples, echo reply 124 may include and/or represent an Internet Control Message Protocol (ICMP) extended echo reply. In one example, the ICMP extended echo reply may be formatted in and/or defined for ICMPv4 and/or ICMPv6. Additionally or alternatively, the ICMP extended echo reply may include and/or be encapsulated in an IP header, such as an IPv4 header and/or IPv6 header.

In some examples, echo reply 124 may include one or more fields, such as IP header fields and/or ICMP fields. In one example, the IP header fields may include and/or identify a source address and/or a destination address for echo reply 124. The source address may be copied from the destination address field of echo request 122. Accordingly, the source address may identify the computing device and/or interface serving as the proxy for probing the status of the virtual interface partitioned on the remote physical interface. The destination address may be copied from the source address field of echo request 122. Accordingly, the destination address may include and/or represent the IP address of the computing device and/or interface from which echo request 122 originated. Examples of such ICMP fields include, without limitation, a type of request and/or probe, a code, a checksum, an identifier, a sequence number, a state field, a reserved field, an active bit, an IPv4 bit, an IPv6 bit, combinations or variations of one or more of the same, and/or any other suitable fields.

Exemplary system 100 in FIG. 1 may be implemented in a variety of ways. For example, all or a portion of exemplary system 100 may represent portions of exemplary system 200 in FIG. 2. As shown in FIG. 2, system 200 may include a network 204. In one example, network 204 may a probing node 218, a proxy node 206, and/or a physical node 208. Alternatively, and as will be described in greater detail below, network 204 may include probing node 218 and a proxy node 206 but exclude and/or omit physical node 208.

As illustrated in FIG. 2, proxy node 206 may include and/or represent memory 140, physical processor 130, and/or proxy interface 120. In one example, proxy node 206 and/or proxy interface 120 may receive echo request 122 from probing node 218 and/or a probing interface 220. In this example, proxy node 206 and/or proxy interface 120 may send echo reply 124 to probing node 218 and/or probing interface 220.

For example, and as will be described in greater detail below, one or more of modules 102 may cause proxy node 206 to (1) receive echo request 122 from probing node 218 within network 204, (2) identify, within echo request 122, a type of probe to be performed in connection with echo request 122, (3) determine, based at least in part on the type of probe identified within echo request 122, that proxy interface 120 included on proxy node 206 is to probe a status of a virtual interface partitioned on a physical interface 210, (4) probe, via proxy interface 120, the status of the virtual interface partitioned on physical interface 210 by way of a virtual function index assigned to the virtual interface, and then (5) send, to probing node 218, echo reply 124 that identifies the status of the virtual interface partitioned on physical interface 210.

Proxy node 206 generally represents any type or form of physical computing device capable of reading computer-executable instructions and/or handling network traffic. In one example, proxy node 206 may include and/or represent a router (such as a provider edge router, hub router, spoke router, autonomous system boundary router, and/or area border router) that receives, routes, forwards, and/or otherwise handles network traffic. Additional examples of proxy node 206 include, without limitation, switches, hubs, modems, bridges, repeaters, gateways, multiplexers, network adapters, network interfaces, client devices, laptops, tablets, desktops, servers, cellular phones, Personal Digital Assistants (PDAs), multimedia players, embedded systems, wearable devices, gaming consoles, variations or combinations of one or more of the same, and/or any other suitable network devices. An apparatus for probing the status of unreachable virtual interfaces partitioned on remote physical interfaces may include and/or represent all or a portion of proxy node 206.

Probing node 218 generally represents any type or form of physical computing device capable of reading computer-executable instructions and/or handling network traffic. In one example, probing node 218 may include and/or represent a router (such as a provider edge router, hub router, spoke router, autonomous system boundary router, and/or area border router) that receives, routes, forwards, and/or otherwise handles network traffic. Additional examples of probing node 218 include, without limitation, switches, hubs, modems, bridges, repeaters, gateways, multiplexers, network adapters, network interfaces, client devices, laptops, tablets, desktops, servers, cellular phones, Personal Digital Assistants (PDAs), multimedia players, embedded systems, wearable devices, gaming consoles, variations or combinations of one or more of the same, and/or any other suitable network devices. An apparatus for probing the status of unreachable virtual interfaces partitioned on remote physical interfaces may include and/or represent all or a portion of probing node 218.

As illustrated in FIG. 2, probing node 218 may include and/or incorporate probing interface 220. In one example, probing interface 220 may include and/or represent a NIC that has a direct connection to proxy interface 120 within network 204. Additional examples of probing interface 220 include, without limitation, packet forwarding engines, routing engines, Physical Interface Cards (PICs), Flexible PIC Concentrators (PCs), Switch Interface Boards (SIBs), control boards, communication ports, fan trays, connector interface panels, line cards, egress interfaces, ingress interfaces, virtual interfaces, portions of one or more of the same, combinations or variations of one or more of the same, and/or any other suitable interface.

Physical node 208 generally represent any type or form of physical computing device capable of reading computer-executable instructions and/or handling network traffic. In the instant disclosure, physical node 208 may represent and/or correspond to the probed node. In other words, physical node 208 may be the one under probe due at least in part to echo request 122. In some examples, physical node 208 may implement Single Root Input/Output Virtualization (SR-IOV). In one example, physical node 208 may include and/or represent a router (such as a provider edge router, hub router, spoke router, autonomous system boundary router, and/or area border router) that receives, routes, forwards, and/or otherwise handles network traffic. Additional examples of physical node 208 include, without limitation, switches, hubs, modems, bridges, repeaters, gateways, multiplexers, network adapters, network interfaces, client devices, laptops, tablets, desktops, servers, cellular phones, Personal Digital Assistants (PDAs), multimedia players, embedded systems, wearable devices, gaming consoles, variations or combinations of one or more of the same, and/or any other suitable network devices. An apparatus for probing the status of unreachable virtual interfaces partitioned on remote physical interfaces may include and/or represent all or a portion of physical node 208.

As illustrated in FIG. 2, physical node 208 may include and/or incorporate physical interface 210. In the instant disclosure, physical interface 210 may support and/or maintain to the probed virtual interface. In other words, a virtual interface partitioned on physical interface 210 may be the one under probe due at least in part to echo request 122. In one example, physical interface 210 may include and/or represent a NIC that has a direct connection to proxy interface 120 within network 204. Additional examples of physical interface 210 include, without limitation, packet forwarding engines, routing engines, Physical Interface Cards (PICs), Flexible PIC Concentrators (FPCs), Switch Interface Boards (SIBs), control boards, communication ports, fan trays, connector interface panels, line cards, egress interfaces, ingress interfaces, virtual interfaces, portions of one or more of the same, combinations or variations of one or more of the same, and/or any other suitable interface.

Network 204 generally represents any medium or architecture capable of facilitating communication or data transfer. In one example, network 204 may include probing node 218, proxy node 206, and/or physical node 208. Additionally or alternatively, network 204 may include facilitate communication among probing node 218, proxy node 206, and/or physical node 208. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

FIG. 3 is a flow diagram of an exemplary computer-implemented method 300 for probing the status of unreachable virtual interfaces partitioned on remote physical interfaces. The steps shown in FIG. 3 may be performed by any suitable computer-executable code and/or computing system, including system 100 in FIG. 1, system 200 in FIG. 2, physical node 208 in FIG. 4, system 700 in FIG. 7, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310 one or more of the systems described herein may receive, at a proxy node within a network, an echo request from a probing node within the network. For example, receiving module 104 may, as part of proxy node 206 and/or proxy interface 120 in FIG. 2, receive echo request 122 from probing node 218 within network 204. In this example, echo request 122 may be configured, constructed, and/or intended to direct proxy node 206 and/or proxy interface 120 to probe the status of an unreachable virtual interface on behalf of probing node 218 and/or probing interface 220.

The systems described herein may perform step 310 in a variety of ways and/or contexts. In some examples, receiving module 104 may monitor proxy node 206 and/or proxy interface 120 for ICMP echo requests. For example, probing node 218 and/or probing interface 220 may be unable to reach a virtual interface partitioned on physical interface 210 of physical node 208. As a result, probing node 218 and/or probing interface 220 may be unable probe the status of that virtual interface directly and/or without assistance from proxy node 206 and/or proxy interface 120.

This inability to reach the virtual interface may be caused by a number of different reasons and/or events. In one example, the virtual interface may be unnumbered. In another example, probing interface 220 and the virtual interface may not be directly connected to one another. In a further example, probing interface 220 may run only IPv4, but the virtual interface runs only IPv6. Conversely, probing interface 220 may run only IPv6, but the virtual interface runs only IPv4. In an additional example, probing node 218 and/or probing interface 220 may lack a route that leads to the virtual interface.

To probe the status of that virtual interface despite the inability to reach the virtual interface directly and/or without assistance, probing node 218 and/or probing interface 220 may generate echo request 122 and send the same to proxy node 206 and/or proxy interface 120. Then, as echo request 122 arrives at proxy node 206 and/or proxy interface 120, receiving module 104 may detect, obtain, and/or receive echo request 122. In this way, proxy node 206 and/or proxy interface 120 may be able to initiate a probe for the status of that virtual interface on behalf of probing node 218 and/or probing interface 220.

Returning to FIG. 3, at step 320 one or more of the systems described herein may identify, within the echo request, a type of probe to be performed in connection with the echo request. For example, identification module 106 may, as part of proxy node 206 and/or proxy interface 120 in FIG. 2, identify a type of probe specified and/or requested in echo request 122. In this example, the type of probe identified within echo request 122 may be a virtual function index probe. In other words, the probe requested may rely on a virtual function index to identify and/or query the correct virtual interface on physical node 208 and/or physical interface 210.

Figure 5:
FIG. 5 is an illustration of an exemplary echo request for a probe of a virtual interface partitioned on a remote physical interface.

The systems described herein may perform step 320 in a variety of ways and/or contexts. In some examples, identification module 106 may search echo request 122 for the type of probe requested by probing node 218 and/or probing interface 220. In such examples, echo request 122 may be structured and/or formatted to carry information that identifies the probe type in a certain location. For example, as illustrated in FIG. 5, echo request 122 may include various segments and/or sections that represent meaningful data in connection with the probe. In this example, identification module 106 may search the segment and/or section dedicated to carrying the information that identifies the type of probe requested. During the search, identification module 106 may identify a value representative of the probe type within the segment and/or section dedicated to carrying the information that identifies the type of probe requested.

Returning to FIG. 3, at step 330 one or more of the systems described herein may determine that a proxy interface included on the proxy node is to probe a status of a virtual interface partitioned on a physical interface based at least in part on the type of probe. For example, identification module 106 may, as part of proxy node 206 and/or proxy interface 120 in FIG. 2, determine that proxy interface 120 is to probe the status of a virtual interface partitioned on physical interface 210. In this example, proxy interface 120 may perform this probe of the virtual interface on behalf of probing node 218 and/or probing interface 220.

The systems described herein may perform step 330 in a variety of ways and/or contexts. In some examples, identification module 106 may identify proxy interface 120 as the one serving as a proxy for probing the status of the virtual interface partitioned on physical interface 210. For example, identification module 106 may search echo request 122 for the destination address. In this example, the destination address may represent and/or correspond to the interface that is to perform the probe on behalf of probing node 218 and/or probing interface 220.

Identification module 106 may also search an ICMP extension structure that identifies the virtual interface partitioned on physical interface 210. In one example, and as illustrated in FIG. 5, the ICMP extension structure may represent a field that includes and/or identifies the virtual function index assigned to the virtual interface being probed. This virtual function index may identify and/or be used to identify the virtual interface being probed.

In some examples, the ICMP extension structure may include a header and/or an interface identification object. The interface identification object may include and/or specify the virtual function index assigned to the virtual interface under probe. In one example, the virtual function index may be a positive integer that identifies and/or represents the virtual interface under probe. In this example, the virtual function index may be a unique identifier with respect to physical node 208 and/or physical interface 210. In other words, the positive integer that identifies the virtual interface on physical node 208 and/or physical interface 210 may not be used to identify any other virtual interfaces on physical node 208 and/or physical interface 210. The positive integer may be specific to the virtual interface under probe.

In one example, physical node 208 may logically partition physical interface 210 into various virtual interfaces. For example, as illustrated in FIG. 4, physical node 208 may include physical interfaces 210(1), 210(2), 210(3), and 210 (4). In this example, physical node 208 may logically partition each of physical interfaces 210(1)-(4) into multiple virtual interfaces via SR-IOV. In some embodiments, each of these virtual interfaces may include and/or represent a virtual machine and/or virtual interface card hosted by and/or instantiated on one of physical interfaces 210(1)-(4).

As a specific example, physical node 208 may create virtual interfaces 424(1)-(N) that share and/or operate on physical interface 210(1). Physical node 208 may create virtual interfaces 434(1)-(N) that share and/or operate on physical interface 210(2). Physical node 208 may create virtual interfaces 444(1)-(N) that share and/or operate on physical interface 210(3). Additionally or alternatively, physical node 208 may create virtual interfaces 454(1)-(N) that share and/or operate on physical interface 210(4).

In one example, physical interface 210(1) may logically partition virtual interfaces 424(1)-(N) and/or implement a structured communication scheme (e.g., a "mailbox" system) with virtual interfaces 424(1)-(N) via SR-IOV. For example, physical interface 210(1) may ping and/or query all virtual interfaces 424(1)-(N) for their respective statuses by way of the structured communication scheme. Additionally or alternatively, one or more virtual interfaces 424(1)-(N) may share their respective statuses with physical interface 210(1) at regular intervals and/or in response to an event.

In some examples, virtual interfaces 424(1)-(N) may share certain data registers with physical interface 210(1) and/or store their respective statuses in those registers for use by physical interface 210(1). Virtual interfaces 424(1)-(N) may be assigned virtual function indices. These virtual function indices may distinguish and/or index the data registers of virtual interfaces 424(1)-(N) with respect to one another.

In one example, the identification module 106 may identify the destination address, the virtual function index, and/or the probe type within echo request 122. In this example, identification module 106 may determine that the destination address corresponds to proxy interface 120 and the probe type is virtual function index. As a result, proxy interface 120 may initiate and/or perform a probe using the virtual function index identified within echo request 122.

In one example, identification module 106 may also identify the interface name, index, and/or address for the physical interface on which the virtual interface under probe is partitioned. As a specific example, echo request 122 may include and/or specify the interface name, index, and/or address corresponding to physical interface 210(1). In this example, echo request 122 may also include and/or identify the virtual function index corresponding to virtual interface 424(1). Accordingly, echo request 122 may be structured and/or intended to prompt proxy interface 120 to probe physical interface 210(1) for the status of virtual interface 424(1).

As illustrated in FIG. 2, physical interface 210 may be included on physical node 208, which is separate and distinct from proxy node 206. However, in other examples, the proxy interface and the physical interface under probe may both reside and/or be included on the same node. For example, although not illustrated in this way in FIG. 2, both proxy interface 120 and physical interface 210 may reside and/or be included on proxy node 206 alone. In this example, echo request 122 may be configured, constructed, and/or intended to direct proxy node 206 and/or proxy interface 120 to probe the status of an unreachable virtual interface on behalf of probing node 218 and/or probing interface 220.

In some examples, echo request 122 may include a local bit that indicates whether (1) the proxy interface and the probed interface are both located on the same or (2) the proxy interface and the probed interface are located on separate nodes. In such examples, identification module 106 may search echo request 122 for the local bit. Identification module 106 may then determine whether the probed interface is located on proxy node 206 or a separate node.

Returning to FIG. 3, at step 340 one or more of the systems described herein may probe, via the proxy interface, the status of the virtual interface partitioned on the physical interface by way of a virtual function index assigned to the virtual interface. For example, probing module 108 may, as part of proxy node 206 and/or proxy interface 120 in FIG. 2, probe the status of the virtual interface partitioned on physical interface 210. In this example, proxy node 206 and/or proxy interface 120 may perform this probe of the virtual interface on behalf of probing node 218 and/or probing interface 220.

The systems described herein may perform step 340 in a variety of ways and/or contexts. In some examples, probing module 108 may query physical interface 210 for the stat of the virtual interface represented by the virtual function index identified in echo request 122. For example, probing module 108 may send a message and/or request to physical interface 210 to continue the probe. In this example, the message and/or request may include the virtual function index identified in echo request 122.

Upon receiving the message and/or request from probing module 108, physical interface 210 may identify the virtual function index within the message and/or request. Physical interface 210 may locate the data register of the virtual interface assigned that virtual function index. Physical interface 210 may then check the data register for information that identifies the status of that virtual interface. Examples of the status of the virtual interface include, without limitation, active, inactive, nonexistent, interface does not exist, query is not supported, combinations and/or variations of one or more of the same, and/or any other suitable status.

Upon obtaining the information that identifies the status of the virtual interface under probe, physical interface 210 may generate a reply that includes the status information. Physical interface 210 may send the reply to proxy interface 120 in satisfaction of the probe. As the reply reaches proxy interface 120 from physical interface 210, proxy interface 120 may identify the status information within the reply.

Returning to FIG. 3, at step 350 one or more of the systems described herein may send, to the probing node, an echo reply that identifies the status of the virtual interface partitioned on the physical interface. For example, reply module 110 may, as part of proxy node 206 and/or proxy interface 120 in FIG. 2, send echo reply 124 to probing node 218 and/or probing interface 220. In this example, echo reply 124 may be configured, constructed, and/or intended to notify probing node 218 and/or probing interface 220 of the status of the virtual interface under probe.

The systems described herein may perform step 350 in a variety of ways and/or contexts. In some examples, reply module 110 may generate echo reply 124 that includes the status information retrieved from physical interface 210. In one example, as illustrated in FIG. 6, echo reply 124 may include various segments and/or sections that represent meaningful data in connection with the probe. For example, echo reply 124 may include an active bit that indicates whether the virtual interface under probe is active or inactive. Reply module 110 may send echo reply 124 to probing node 218 and/or probing interface 220 in response to and/or in satisfaction of echo request 122.

Upon receiving echo reply 124, probing node 218 and/or probing interface 220 may identify the status information within echo reply 124. In some examples, probing node 218 and/or probing interface 220 may record the status information for reference and/or use in connection with the probed virtual interface. Additionally or alternatively, probing node 218 and/or probing interface 220 may perform one or more actions on network 204 based at least in part on the status of the probed virtual interface.

As a specific example, in the event that the probed virtual interface is currently inactive, probing node 218 and/or probing interface 220 may execute a failover operation that redirects network traffic from the probed virtual interface to another interface within network 204. In another example, probing node 218 and/or probing interface 220 may advertise a route for network traffic that calls for bypassing the probed virtual interface due at least in part to the probed virtual interface being inactive. Additionally or alternatively, probing node 218 and/or probing interface 220 may advertise a route that directs network traffic to the probed virtual interface due at least in part to the probed virtual interface being active.

Figure 7:
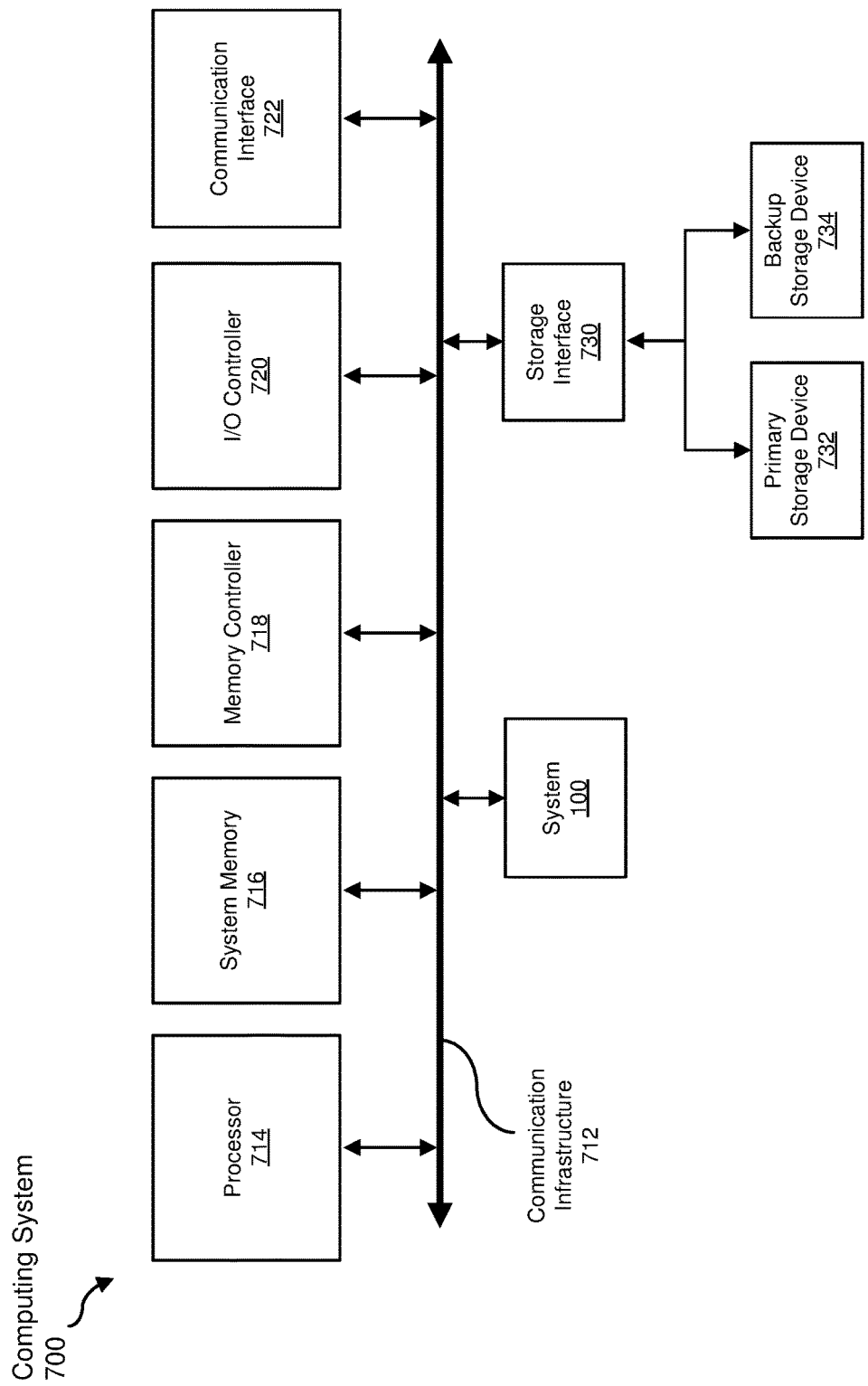
FIG. 7 is a block diagram of an exemplary computing system capable of implementing and/or being used in connection with one or more of the embodiments described and/or illustrated herein.

FIG. 7 is a block diagram of an exemplary computing system 700 capable of implementing and/or being used in connection with one or more of the embodiments described and/or illustrated herein. In some embodiments, all or a portion of computing system 700 may perform and/or be a means for performing, either alone or in combination with other elements, one or more of the steps described in connection with FIG. 3. All or a portion of computing system 700 may also perform and/or be a means for performing and/or implementing any other steps, methods, or processes described and/or illustrated herein.

Computing system 700 broadly represents any type or form of electrical load, including a single or multi-processor computing device or system capable of executing computer-readable instructions. Examples of computing system 700 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 700 may be programmed, configured, and/or otherwise designed to comply with one or more networking protocols. According to certain embodiments, computing system 700 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 700 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 700 may include various network and/or computing components. For example, computing system 700 may include at least one processor 714 and a system memory 716. Processor 714 generally represents any type or form of processing unit capable of processing data or interpreting and executing instructions. For example, processor 714 may represent an application-specific integrated circuit (ASIC), a system on a chip (e.g., a network processor), a hardware accelerator, a general purpose processor, and/or any other suitable processing element.

Processor 714 may process data according to one or more of the networking protocols discussed above. For example, processor 714 may execute or implement a portion of a protocol stack, may process packets, may perform memory operations (e.g., queuing packets for later processing), may execute end-user applications, and/or may perform any other processing tasks.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 700 may include both a volatile memory unit (such as, for example, system memory 716) and a non-volatile storage device (such as, for example, primary storage device 732, as described in detail below). System memory 716 may be implemented as shared memory and/or distributed memory in a network device. Furthermore, system memory 716 may store packets and/or other information used in networking operations.

In certain embodiments, exemplary computing system 700 may also include one or more components or elements in addition to processor 714 and system memory 716. For example, as illustrated in FIG. 7, computing system 700 may include a memory controller 718, an Input/Output (I/O) controller 720, and a communication interface 722, each of which may be interconnected via communication infrastructure 712. Communication infrastructure 712 generally represents any type or form of infrastructure capable of facilitating communication between one or more components of a computing device. Examples of communication infrastructure 712 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 718 generally represents any type or form of device capable of handling memory or data or controlling communication between one or more components of computing system 700. For example, in certain embodiments memory controller 718 may control communication between processor 714, system memory 716, and I/O controller 720 via communication infrastructure 712. In some embodiments, memory controller 718 may include a Direct Memory Access (DMA) unit that may transfer data (e.g., packets) or from a link adapter.

I/O controller 720 generally represents any type or form of device or module capable of coordinating and/or controlling the input and output functions of a computing device. For example, in certain embodiments I/O controller 720 may control or facilitate transfer of data between one or more elements of computing system 700, such as processor 714, system memory 716, communication interface 722, and storage interface 730.

Communication interface 722 broadly represents any type or form of communication device or adapter capable of facilitating communication between exemplary computing system 700 and one or more additional devices. For example, in certain embodiments communication interface 722 may facilitate communication between computing system 700 and a private or public network including additional computing systems. Examples of communication interface 722 include, without limitation, a link adapter, a wired network interface (such as a network interface card), a wireless network interface (such as a wireless network interface card), and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 722 may also represent a host adapter configured to facilitate communication between computing system 700 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also enable computing system 700 to engage in distributed or remote computing. For example, communication interface 722 may receive instructions from a remote device or send instructions to a remote device for execution.

As illustrated in FIG. 7, exemplary computing system 700 may also include a primary storage device 732 and/or a backup storage device 734 coupled to communication infrastructure 712 via a storage interface 730. Storage devices 732 and 734 generally represent any type or form of storage device or medium capable of storing data and/or other computer-readable instructions. For example, storage devices 732 and 734 may represent a magnetic disk drive (e.g., a so-called hard drive), a solid state drive, a floppy disk drive, a magnetic tape drive, an optical disk drive, a flash drive, or the like. Storage interface 730 generally represents any type or form of interface or device for transferring data between storage devices 732 and 734 and other components of computing system 700.

In certain embodiments, storage devices 732 and 734 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 734 may also include other similar structures or devices for allowing computer software, data, or other computer-readable instructions to be loaded into computing system 700. For example, storage devices 732 and 734 may be configured to read and write software, data, or other computer-readable information. Storage devices 732 and 734 may be a part of computing system 700 or may be separate devices accessed through other interface systems.

Many other devices or subsystems may be connected to computing system 700. Conversely, all of the components and devices illustrated in FIG. 7 need not be present to practice the embodiments described and/or illustrated herein. The devices and subsystems referenced above may also be interconnected in different ways from those shown in FIG. 7. Computing system 700 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
   receiving, at a proxy node within a network, an echo request from a probing node within the network;
   identifying, within the echo request, a type of probe to be performed in connection with the echo request;
   determining, based at least in part on the type of probe identified within the echo request, that a proxy interface included on the proxy node is to probe a status of a virtual interface partitioned on a physical interface, wherein:
      the virtual interface is one of a plurality of virtual interfaces that are partitioned on the physical interface;
      the physical interface is included on a physical node that implements Single Root Input/Output Virtualization (SR-IOV); and
      the physical node creates the plurality of virtual interfaces via the SR-IOV;
   probing, via the proxy interface, the status of the virtual interface partitioned on the physical interface by way of a virtual function index assigned to the virtual interface; and
   sending, to the probing node, an echo reply that identifies the status of the virtual interface partitioned on the physical interface.

2. The method of claim 1, wherein the physical node comprises at least one of:
   the proxy node; and
   a physical device that is directly connected to the proxy node.

3. The method of claim 1, wherein the plurality of virtual interfaces are assigned virtual function indices that distinguish the plurality of virtual interfaces from one another.

4. The method of claim 3, wherein each virtual function index is a unique identifier relative to the physical interface on which the plurality of virtual interfaces are partitioned.

5. The method of claim 1, wherein probing the status of the virtual interface partitioned on the physical interface comprises querying the physical interface that created the plurality of virtual interfaces via the SR-IOV for the status of the virtual interface.

6. The method of claim 1, wherein:
   the proxy node receives the echo request from a probing interface included on the probing node; and
   the proxy node sends the echo reply to the probing interface included on the probing node.

7. The method of claim 1, wherein the virtual interface partitioned on the physical interface is not directly reachable from the probing node.

8. The method of claim 1, wherein the virtual function index comprises a positive integer that identifies the virtual interface.

9. The method of claim 1, wherein the status of the virtual interface comprises at least one of:
   active;
   inactive; and
   nonexistent.

10. The method of claim 1, further comprising performing at least one action on the network based at least in part on the status of the virtual interface.

11. The method of claim 10, wherein the action performed on the network comprises at least one of:
- executing failover operation that redirects network traffic from the virtual interface to another interface;
- advertising a route for network traffic that calls for bypassing the virtual interface due at least in part to the virtual interface being inactive; and
- advertising a route that directs network traffic to the virtual interface due at least in part to the virtual interface being active.

12. The method of claim 1, wherein the echo request includes:
- a source address that identifies a probing interface included on the probing node;
- a destination address that identifies the probing interface included on the proxy node; and
- an Internet Control Message Protocol (ICMP) extension structure that identifies the virtual interface partitioned on the physical interface.

13. The method of claim 12, wherein the ICMP extension structure comprises a field that includes the virtual function index assigned to the virtual interface.

14. The method of claim 13, wherein the proxy interface:
- identifies the virtual function index assigned to the virtual interface; and
- as part of probing the status of the virtual interface, sends the virtual function index to the physical interface on which the virtual interface is partitioned.

15. A system comprising:
- a receiving module, stored in memory on a proxy node within a network, that receives an echo request from a probing node within the network;
- an identification module, stored in memory on the proxy node, that:
  - identifies, within the echo request, a type of probe to be performed in connection with the echo request;
  - determines, based at least in part on the type of probe identified within the echo request, that a proxy interface included on the proxy node is to probe a status of a virtual interface partitioned on a physical interface, wherein:
    - the virtual interface is one of a plurality of virtual interfaces that are partitioned on the physical interface;
    - the physical interface is included on a physical node that implements Single Root Input/Output Virtualization (SR-IOV); and
    - the physical node creates the plurality of virtual interfaces via the SR-IOV;
- a probing module, stored in memory on the proxy node, that probes, via the proxy interface, the status of the virtual interface partitioned on the physical interface by way of a virtual function index assigned to the virtual interface; and
- a reply module, stored in memory on the proxy node, that sends, to the probing node, an echo reply that identifies the status of the virtual interface partitioned on the physical interface; and
- at least one physical processor programmed to execute the receiving module, the identification module, the probing module, and the reply module.

16. The system of claim 15, wherein the physical node comprises at least one of:
- the proxy node; and
- a physical device that is directly connected to the proxy node.

17. An apparatus comprising:
- a proxy interface that is communicatively coupled to:
  - a probing interface included on a probing node within a network;
  - and a virtual interface partitioned on a physical interface;
- at least one processing device communicatively coupled to the proxy interface, wherein the processing device:
  - receives, via the proxy interface, an echo request from the probing node within the network;
  - identifies, within the echo request, a type of probe to be performed in connection with the echo request;
  - determines, based at least in part on the type of probe identified within the echo request, that the proxy interface is to probe a status of the virtual interface partitioned on the physical interface, wherein:
    - the virtual interface is one of a plurality of virtual interfaces that are partitioned on the physical interface;
    - the physical interface is included on a physical node that implements Single Root Input/Output Virtualization (SR-IOV); and
    - the physical node creates the plurality of virtual interfaces via the SR-IOV;
  - probes, via the proxy interface, the status of the virtual interface partitioned on the physical interface by way of a virtual function index assigned to the virtual interface; and
  - sends, to the probing node via the proxy interface, an echo reply that identifies the status of the virtual interface partitioned on the physical interface.

* * * * *